(12) United States Patent
Shanjani et al.

(10) Patent No.: US 12,133,314 B2
(45) Date of Patent: Oct. 29, 2024

(54) ELECTRONIC DEVICES HAVING FAILSAFE MECHANISMS WITH NEAR FIELD COMMUNICATIONS

(71) Applicant: Apple Inc., Cupertino, CA (US)

(72) Inventors: Yaser Shanjani, Fremont, CA (US); Michael K. McCord, San Francisco, CA (US); Tong Chen, Fremont, CA (US)

(73) Assignee: Apple Inc., Cupertino, CA (US)

( * ) Notice: Subject to any disclaimer, the term of this patent is extended or adjusted under 35 U.S.C. 154(b) by 797 days.

(21) Appl. No.: 17/229,729

(22) Filed: Apr. 13, 2021

(65) Prior Publication Data

US 2022/0330410 A1    Oct. 13, 2022

(51) Int. Cl.
*H05B 47/20* (2020.01)
*H02J 50/10* (2016.01)
*H04B 5/70* (2024.01)
*H04B 10/11* (2013.01)

(52) U.S. Cl.
CPC .............. *H05B 47/20* (2020.01); *H02J 50/10* (2016.02); *H04B 5/70* (2024.01); *H04B 10/11* (2013.01)

(58) Field of Classification Search
CPC ........ H05B 47/20; H02J 50/10; H02J 50/402; H02J 50/90; H04B 5/70; H04B 10/11
See application file for complete search history.

(56) References Cited

U.S. PATENT DOCUMENTS

| 8,626,065 B2 | 1/2014 | Griffin et al. |
| 8,982,008 B2 | 3/2015 | Parsche |
| 9,426,548 B2 | 8/2016 | Rayner et al. |
| 9,633,247 B2 | 4/2017 | Pope et al. |
| 9,749,016 B2 | 8/2017 | Cox |
| 10,355,750 B2 | 7/2019 | Fujii et al. |
| 10,634,313 B2 | 4/2020 | Moriya et al. |
| 10,956,864 B2 | 3/2021 | Rahilly et al. |
| 10,958,311 B2 | 3/2021 | Ayers et al. |
| 10,963,772 B1 * | 3/2021 | Longobardi ..... G06K 19/07327 |
| 2009/0237011 A1 * | 9/2009 | Shah ........................ F21S 8/035 313/1 |
| 2011/0204816 A1 * | 8/2011 | Policy .................... H05B 45/30 315/294 |

(Continued)

*Primary Examiner* — Renan Luque
(74) *Attorney, Agent, or Firm* — Treyz Law Group, P.C.; G. Victor Treyz; Kendall P. Woodruff

(57) ABSTRACT

First and second parts of an optical component may be spatially separated and not electrically connected. A passive side may contain an optical element. An active side may contain a light-emitting device. To detect damage to the optical element, passive side circuitry that is associated with the optical element may monitor a fail-safe resistor on the optical element for changes in resistance. The circuitry may use a passive side near-field communications antenna to transmit information such as information on the fail-safe resistor to active side circuitry that is associated with the light-emitting device using near-field communications. The active side circuitry can receive the transmitted information using an active side near-field communications antenna and can adjust the light-emitting device accordingly. The active side circuitry can also monitor the active side near-field communications antenna to detect when the passive side and active side antennas have been moved apart.

27 Claims, 11 Drawing Sheets

(56) References Cited

U.S. PATENT DOCUMENTS

| | | | |
|---|---|---|---|
| 2014/0265930 A1* | 9/2014 | Harris | H05B 47/199 |
| | | | 315/307 |
| 2016/0182127 A1* | 6/2016 | Karandikar | G06K 7/00 |
| | | | 455/41.1 |
| 2016/0270183 A1* | 9/2016 | Wölfing | H05B 47/16 |
| 2017/0048937 A1* | 2/2017 | Wang | H02J 50/10 |
| 2020/0044305 A1 | 2/2020 | Samardzija et al. | |
| 2021/0103938 A1* | 4/2021 | Bulawski | H04L 63/0853 |

\* cited by examiner

ELECTRONIC DEVICES HAVING FAILSAFE MECHANISMS WITH NEAR FIELD COMMUNICATIONS

FIELD

This relates generally to electronic devices, and, more particularly, to electronic devices with optical components.

BACKGROUND

Electronic devices such as tablet computers, cellular telephones, and other equipment are sometimes provided with optical components. These optical components may include light-emitting devices and corresponding optical elements sensors such as diffusers. To ensure that the optical components are operated within desired limits, failsafe mechanisms may be deployed.

SUMMARY

A system may have subsystems. For example, an electronic device may have a module or other system such as an optical component system that has multiple submodules or other subsystems. First and second parts (subsystems or submodules) of an optical component or other system may be spatially separated and disconnected from each other electrically. With this type of arrangement, an air gap may be present between the subsystems while no electrical pathways are present to convey wired signals between the subsystems.

To permit power and/or data to be conveyed between the subsystems (e.g., the first and second parts of the system), the first part may be provided with a first near-field radio-frequency (RF) communications antenna and the second part may be provided with a second near-field RF communications antenna. The first part of the optical component and the first near-field communications antenna may sometimes be referred to as forming an "active side" of the optical component or other system. The second part of the optical component or other system and the second near-field communications antenna may sometimes be referred to as forming a "passive side" of the optical component. The active side may include a light-emitting device or other adjustable device. The light-emitting device and other circuitry on the active side may receive wired power. The passive side may correspond to an optical element such as a diffuser that receives light from the light-emitting device or other subsystem. The passive side may be precisely aligned to a product enclosure and physically separated from the active side, giving rise to potential challenges with creating physical wiring between the active side and passive side. Accordingly, the near-field communications antenna in the passive side may receive wireless power from the near-field communications antenna in the active side.

Using these antennas, power may be transferred from the active side to the passive side and the circuitry of the active and passive sides may communicate with each other wirelessly. This arrangement allows power to be supplied to the passive side without requiring physical wires. This arrangement also allows information (sometimes referred to as fail-safe information) on potential damage to a portion of the passive side to be reported to the active side, which can then take appropriate action. The active side can also measure antenna impedance, resonant frequency, and/or other radio-frequency antenna characteristics using vector network analyzer circuitry or other monitoring circuitry. This allows the active side to detect if the active and passive sides have moved with respect to each other. If movement is detected, appropriate action may be taken.

The use of wireless power and communications between the active and passive sides, helps with product integration. Tight alignment of the optical element to other features in the system may be achieved, such as an array of fine apertures—the laser cannot be tightly aligned to these because it may be bound to other independent features like a receiver with its own alignment scheme, with very tight requirements on the drive synchronization of the laser and receiver (e.g., they should be close/coupled).

In general, the wireless circuitry of the active and passive sides may be used for any subsystems in a product to allow these systems to communicate with each other and monitor or enforce their relative positioning, without the burden of physically interconnecting them. Arrangements in which the active and passive sides correspond to first and second parts (submodules) of a module such as an optical component may sometimes be described herein as an example.

In an illustrative configuration, the passive side of the optical component contains an optical element and the active side contains a light-emitting device such as an infrared laser that is configured to emit light through the optical element. To detect damage to the optical element, passive side circuitry that is associated with the optical element may monitor a fail-safe system (sometimes referred to as a fail-safe mechanism). The fail-safe system may use capacitive fail-safe electrodes, ultrasonic fail-safe monitoring, and/or other fail-safe circuitry. In an illustrative configuration, which is sometimes be described herein as an example, the fail-safe system includes a fail-safe resistor. Other types of fail-safe arrangements may be used, if desired.

The fail-safe resistor on the optical element may be monitored by the passive side circuitry for changes in resistance. Using near-field communications, the passive side may use a near-field communications antenna to transmit information such as information on the fail-safe resistor to a near-field communications antenna on the active side. The active side can receive the transmitted information using its near-field communications antenna and can adjust the light-emitting device accordingly. For example, light emission may be prevented in response to detection of damage to the optical element. The active side can also monitor its near-field communications antenna to detect when the antennas of the active and passive sides have been moved relative to each other or other undesired change in operation has occurred, thereby indicating that the optical element has moved relative to the light-emitting device or has otherwise changed its operation. In response, light emission may be prevented or other action taken.

DETAILED DESCRIPTION

Figure 1:
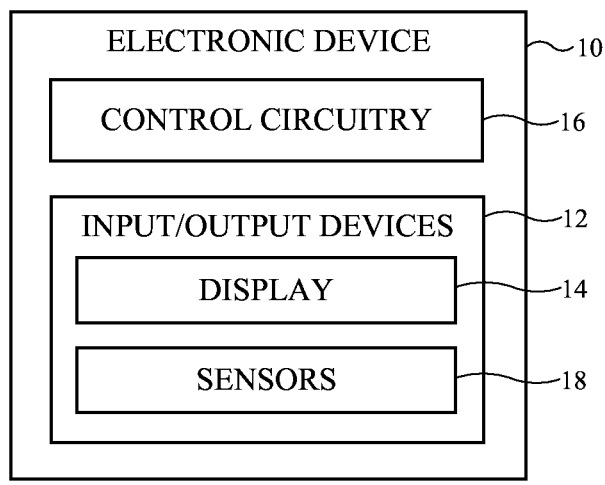
FIG. 1 is a schematic diagram of an illustrative electronic device in accordance with an embodiment.

A schematic diagram of an illustrative electronic device that may include one or more optical components is shown in FIG. 1. Electronic device 10 of FIG. 1 may be a computing device such as a laptop computer, a computer monitor containing an embedded computer, a tablet computer, a cellular telephone, a media player, or other handheld or portable electronic device, a smaller device such as a wristwatch or other device worn on a user's wrist, a pendant device, a headphone or earpiece device, a head-mounted device such as eyeglasses, goggles, or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. Illustrative configurations in which device 10 is a portable device such as a cellular telephone or tablet computer of may sometimes be described herein as an example.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc. Control circuitry 16 may include communications circuitry for supporting wired and/or wireless communications between device 10 and external equipment. For example, control circuitry 16 may include wireless communications circuitry such as cellular telephone communications circuitry, wireless local area network communications circuitry, and near-field communications circuitry.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, haptic output devices, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be an organic light-emitting diode display, a display formed from an array of crystalline semiconductor light-emitting diode dies, a liquid crystal display, or other display. Display 14 may be a touch screen display or a display that is insensitive to touch.

As shown in FIG. 1, input-output devices 12 may include sensors 18. Sensors 18 may include capacitive sensors, light-based proximity sensors, magnetic sensors, accelerometers, force sensors, touch sensors, temperature sensors, pressure sensors, inertial measurement units, accelerometers, gyroscopes, compasses, microphones, radio-frequency sensors, three-dimensional image sensors (e.g., structured light sensors with light emitters such as infrared light emitters configured to emit structured light and corresponding infrared image sensors, three-dimensional sensors based on pairs of two-dimensional image sensors, etc.), cameras (e.g., visible light cameras and/or infrared light cameras with or without associated flood illuminators and/or flash systems), light-based position sensors (e.g., lidar sensors), monochrome and/or color ambient light sensors, and other sensors. Sensors 18 such as ambient light sensors, image sensors, optical proximity sensors, lidar sensors, optical touch sensors, and other sensors that use light and/or components that emit light such as status indicator lights and other light-emitting components may sometimes be referred to as optical components. If desired, sensors 18 may include integrity monitoring (failsafe) sensors.

Figure 2:
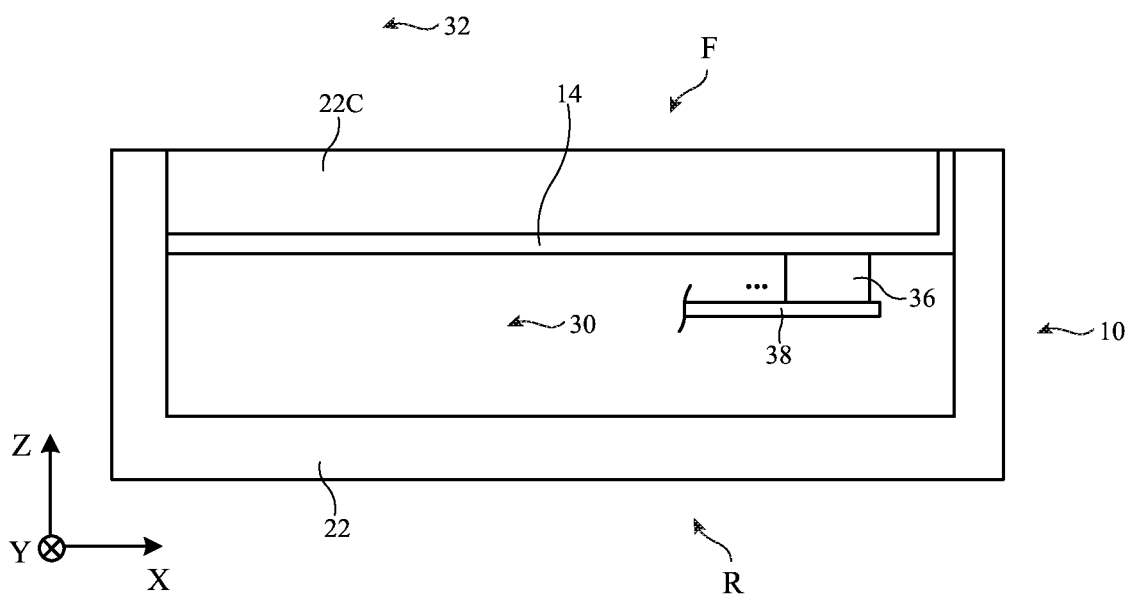
FIG. 2 is a cross-sectional side view of an illustrative electronic device in accordance with an embodiment.

A cross-sectional side view of an illustrative electronic device is shown in FIG. 2. As shown in FIG. 2, device 10 may include housing 22. Housing 22, which may sometimes be referred to as an enclosure or case, may be formed of plastic, glass, ceramics, fiber composites, metal (e.g., stainless steel, aluminum, etc.), other suitable materials, or a combination of any two or more of these materials. In the example of FIG. 2, device 10 has a front F and an opposing rear R. Display 14 may be mounted at front F and may be covered by a transparent portion of housing 22 such as display cover layer 22C.

As shown in the cross-sectional side view of device 10 of FIG. 2, housing 22 (including portion 22C) may separate an interior region of device 10 such as interior region 30 from an exterior region surrounding device 10 such as exterior region 32. Housing 22 may be formed using a unibody configuration in which some or all of housing 22 is machined or molded as a single structure or may be formed using multiple structures (e.g., an internal frame structure, one or more structures that form exterior housing surfaces, etc.). If desired, a strap may be coupled to a main portion of housing 22 (e.g., in configurations in which device 10 is a wristwatch or head-mounted device).

Optical components such as optical component 36 and/or other internal electrical components (e.g., integrated circuits, discrete components, light sources, light detectors, cameras, and other optical components, etc.) for forming control circuitry 16 and input-output devices 12 may be mounted in interior 30 of housing 22 (e.g., on one or more substrates such as printed circuit 38). In some configurations, components may be mounted in interior 30 under or adjacent to display 14 and/or adjacent to a rear housing wall portion of housing 22 at rear R. For example, one or more front-facing optical components such as component 36 may be mounted under a portion of display 14 and may be configured to operate through partially transparent portions of display 14 and display cover layer 22C in a front-facing arrangement. If desired, optical components in device 10 may also include one or more rear-facing optical components that are mounted under a transparent rear housing wall in housing 22 or that are mounted under an optical component window. In general, components such as optical component 36 may be formed in any suitable portion of device 10 and may be mounted to one or more printed circuits such as printed circuit 38. The example of FIG. 2 is illustrative.

Optical components such as component 36 may include devices that emit and/or detect light (see, e.g., light-based components in sensors 18), may include flood illuminators for two-dimensional (2D) and three-dimensional (3D) image sensors and/or other sensors (e.g., flood illuminators that emit a sequence of flood infrared illumination), may include gaze tracking sensors (e.g., light emitters that create eye illumination and glints for a gaze tracker), may include components that emit structured light (e.g., optical modules that project 2D or 3D spatially structured patterns onto far-field objects), may include optical proximity sensors that emit and detect infrared light, may include time-of-flight sensors, may include coherent lidar sensors, may include ambient light sensors, may include two-dimensional and/or three-dimensional image sensors, may include fingerprint sensors (e.g., optical fingerprint sensors), and/or may include other optical components.

Figure 3:
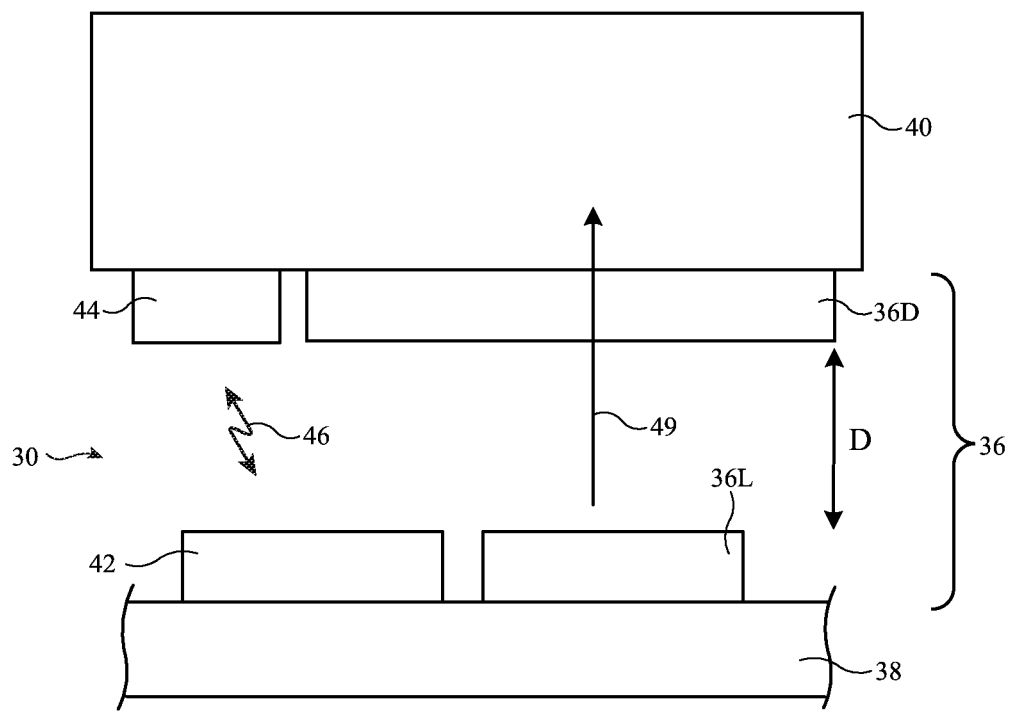
FIG. 3 is a side view of an illustrative optical component in which near-field communications is being used to communicate between parts of the component that are spatially separated and electrically disconnected in accordance with an embodiment.

FIG. 3 is a cross-sectional side view of an illustrative optical component. As shown in FIG. 3, optical component 36 may include parts such as active and passive sides that are spatially separated from each other and that are not electrically interconnected (e.g., no conductive paths between the active and passive sides are present to carry wired power or signals between the active and passive sides). In the example of FIG. 3, the passive side may include an optical element such as optical element 36D and the active side may include a light source such as light-emitting device 36L.

Light-emitting device 36L may be, for example, a visible or infrared laser device having one or more semiconductor lasers (e.g., one or more vertical cavity surface-emitting lasers and/or other laser diodes). Light-emitting device 36L may also include beam-shaping optics in the light path of laser light emitted towards optical element 36D, such as a collimating lens. Optical element 36D may include beam-shaping optics such as geometric optics (e.g., a microlens array) and/or flat optics (e.g., diffractive optics and metasurfaces), may be a diffractive optical element such as a grating, may be a hologram, may be a diffuser, may be a lens, may have multiple lenses arranged to form a microlens array, may have an array of nanostructures on a planar substrate that form one or more metalenses, may include a prism, a mirror, and/or may include one or more other optical structures that reflect, focus, diffuse, diffract, refract, and/or otherwise modify light emitted by device 36L. An illustrative configuration, device 36L contains an array of infrared lasers and element 36D is a diffuser so that component 36 may provide diffuse infrared illumination (e.g., component 36 may operate as an infrared flood illumination for an infrared image sensor). Other arrangements may be used, if desired. Configurations in which device 36L contains lasers and element 36D is a diffuser are merely illustrative.

As shown in FIG. 3, element 36D may be mounted in interior 30 behind structure 40. Structure 40 may be a display, display cover layer 22C, an optical window, transparent housing wall structures, and/or other structures in housing 22 and/or other portions of device 10 that allow component 36 to transmit and/or receive light (e.g., light to illuminate exterior region 32, light from exterior region 32, etc.). In some arrangements, element 36 may operate through display 14. For example, display 14 may be a thin-film organic light-emitting diode display with partially transparent anodes and/or pixel definition layer openings that are transparent to light or may be another display with partially transparent areas through which light for component 36 may pass (e.g., a light-emitting diode display having an array of semiconductor light-emitting diode dies between which transparent regions are present). In this type of arrangement, optical element 36D may include an array of microlenses, metalenses, and/or other optical structures that help direct light emitted by device 36L through the openings in display 14. Lenses, nanostructures, diffusing structures, and/or other optical structures for element 36D may sometimes be supported by a transparent substrate in element 36D (e.g., a transparent planar substrate formed from glass, transparent polymer, transparent ceramic, transparent crystalline material such as sapphire, etc.). In general, components 36 may be mounted at any suitable location in device 10. The use of a component mounting location that is behind a display is merely illustrative.

As the example of FIG. 3 demonstrates, component 36 may be formed from two or more spatially separated parts. The spatially separated parts may be separated by an air gap and may be free from any direct electrical or mechanical connections. For example, component 36 may have spatially separated active and passive sides (portions) where no conductive paths directly or indirectly bridge the air gap separating the active and passive sides and where there is thus no wired communications path spanning the gap. The component may also be free of any mechanical members that directly span the air gap between the active and passive sides.

In an illustrative arrangement, a first part of component 36 such as element 36D may be mounted on structure 40 (e.g., display 14 and/or display cover layer 22C), whereas a second part of component 36 such as device 36L may be mounted at another location in interior 30 (e.g., on a structure that is coupled to the rear of housing 22 or other interior support structure where device 36L may emit light 49 that passes through element 36D and structure 40). Device 36L may, as an example, be mounted at a distance D from element 36D. The value of D may be at least 100 microns, at least 300 microns, at least 1 mm, at least 3 mm, at least 9 mm, less than 10 mm, less than 4 mm, less than 2 mm, less than 900 microns, less than 400 microns, or other suitable value. Device 36L may be mounted in interior 30 so that device 36L may emit light 49 that passes through element 36D and structure 40 during operation of device 10 (e.g., to provide infrared flood illumination for an image sensor, etc.).

To ensure eye and skin safety for users of device 10, optical component 36 may be provided with one or more safety mechanisms. These safety mechanisms may include one or more failsafe sensors that can detect when structures have been damaged by exposure to excessive stress or other undesired conditions. In an illustrative configuration, a metal trace that serves as a failsafe resistor may be included in circuitry 44 that is associated with element 36D (and that is formed adjacent to element 36D and/or as part of element 36D). The metal trace may be formed from a zig-zagged metal line that covers some or all of the surface of element 36D. If a crack or a chip develops in element 36D, the metal trace will form an open circuit or otherwise experience a rise in resistance above its normal value. By detecting the rise in resistance of the failsafe resistor, damage to element 36D can be detected and appropriate action taken (e.g., to prevent the emission of light 49 from device 36L, etc.).

In addition to one or more failsafe sensors such as failsafe resistors or other failsafe sensing structures, circuitry 44 may include control circuitry for performing resistance measurements on the failsafe resistor and may include wireless communications circuitry for wirelessly communicating with corresponding circuitry 42 that is associated with device 36L (and that is formed as part of device 36L and/or is adjacent to device 36L). Both circuitry 44 and circuitry 42 may include coils that serve as near-field communications (NFC) antennas and may include processing and communications circuitry. During operation, wireless signals 46 may be transmitted from circuitry 42 to circuitry 44 and/or may be transmitted from circuitry 44 to circuitry 42. Signals 46 may have any suitable frequency (e.g., 13.56 MHz, at least 10 kHz, at least 100 kHz, at least 1 MHz, at least 10 MHz, less than 10 GHz, less than 1 GHz, less than 100 MHz, less than 15 MHz, etc.).

Wireless signals 46 may be used to convey power and data. As an example, circuitry 42 may include NFC reader circuitry and circuitry 44 may include corresponding NFC tag circuitry. During operation, the reader circuitry may transmit signals 46 to the tag circuitry using an NFC antenna in circuitry 42. The tag circuitry may receive the transmitted signals using an NFC antenna in circuitry 44. The tag circuitry may then harvest energy from the received signals to use in powering circuitry 44.

When powered using wireless power from circuitry 42, circuitry 44 can perform failsafe resistor measurements and other operations and can send corresponding data to circuitry 42. If desired, signal measurements that are sensitive to alignment between the corresponding NFC antennas may also be made and processed to provide failsafe functions. As an example, circuitry 42 may monitors its NFC antenna to make measurements of NFC antenna impedance, to measure the resonant frequency of its NFC antenna, to measure a signal strength associated with signals being communicated between circuitry 42 and 44, and/or to measure other characteristics associated with the NFC link between circuitry 42 and 44. This information may then be used to determine whether element 36D is properly aligned with device 36L, etc. As an example, antenna measurements can be used to determine when an NFC antenna associated with the NFC tag has been moved away from an NFC antenna associated with the NFC reader. Because this movement may indicate that device 36L and 36D are not aligned for proper operation, appropriate action such as preventing light emission from device 36D may be taken in response.

The use of a wireless link between the spatially separated parts of component 36 can reduce or eliminate the need for mechanical contacts for transferring power and data between these parts, can support the transmission of fail-safe measurements between these parts, can be used to perform alignment and/or proximity measurements (by detecting antenna impedance changes, resonant frequency changes, and/or signal strength changes associated with relative movement between the NFC antennas), can be used to provide wireless feedback signals from one part of component 36 to another, etc. By reducing or eliminating the need for mechanical coupling and/or contact between device 36L and element 36D of component 36, the accuracy with which component 36 is aligned with respect to structures in device 10 can be enhanced (e.g., the accuracy with which element 36D is aligned to display openings and/or other features of structure 40 may be enhanced because mechanical forces on element 36D that could cause misalignment can be reduced or eliminated).

Figure 4:
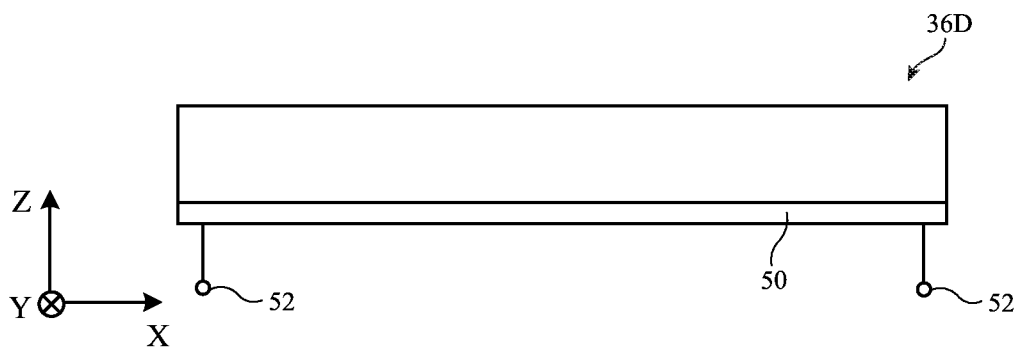
FIG. 4 is a side view of an illustrative optical element with a metal trace or other conductive trace forming a failsafe resistor in accordance with an embodiment.
Figure 5:
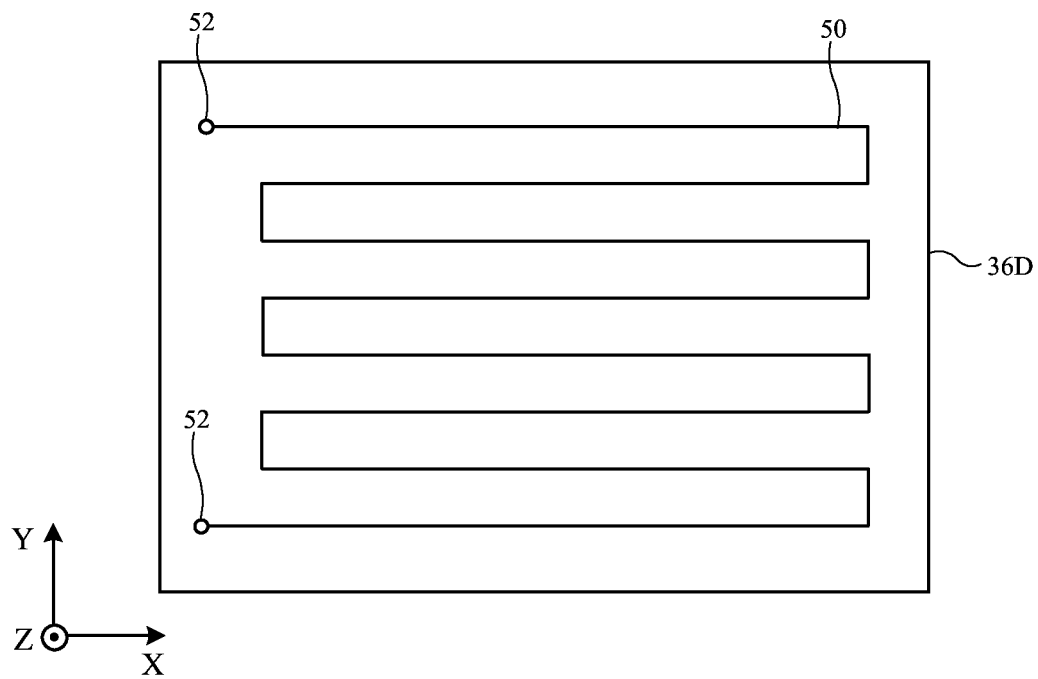
FIG. 5 is a top view of the illustrative optical element of FIG. 4 in accordance with an embodiment.

FIG. 4 is a cross-sectional side view of an illustrative optical element for component 36. As shown in FIG. 4, optical element 36D may have the shape of a planar layer that lies parallel to the X-Y plane. The thickness of this layer may be at least 1 micron, at least 10 microns, at least 100 microns, at least 1000 microns, less than 10 mm, less than 5 mm, less than 500 microns, less than 50 microns, or other suitable thickness. Thin-film metal traces may be formed on one or both surfaces of element 36D and/or may be embedded within element 36D during fabrication of element 36D to serve as a fail-safe resistor (resistor 50) that can detect cracks, chips, liquid / dust ingression or other damage to element 36D and/or other fail-safe sensors may be incorporated into component 36. Terminals 52 of resistor 50 may be monitored by control circuitry in circuitry 44. FIG. 5 is a top view of optical element 36D of FIG. 4 showing how resistor 50 may have a path that covers the surface of element 36D. The metal trace may sawtooth along its length and/or may have other configurations. The example of FIG. 5 in which the metal trace of resistor 50 has straight segments to cover most or all of the surface of element 36D with uniform spacing is illustrative. Alternatively, the trace of resistors 50 may have zig-zag segments, sinusoidal segments, multilayers of interleaving segments in metal or thin-film conductive materials to ensure maximum fail-safe coverage. The fail-safe trace may be formed as non-planar layer following non-planer optical surfaces, such as a geometric lens, lens array, Fresnel lens, wedge, wedge array etc.

Figure 6:
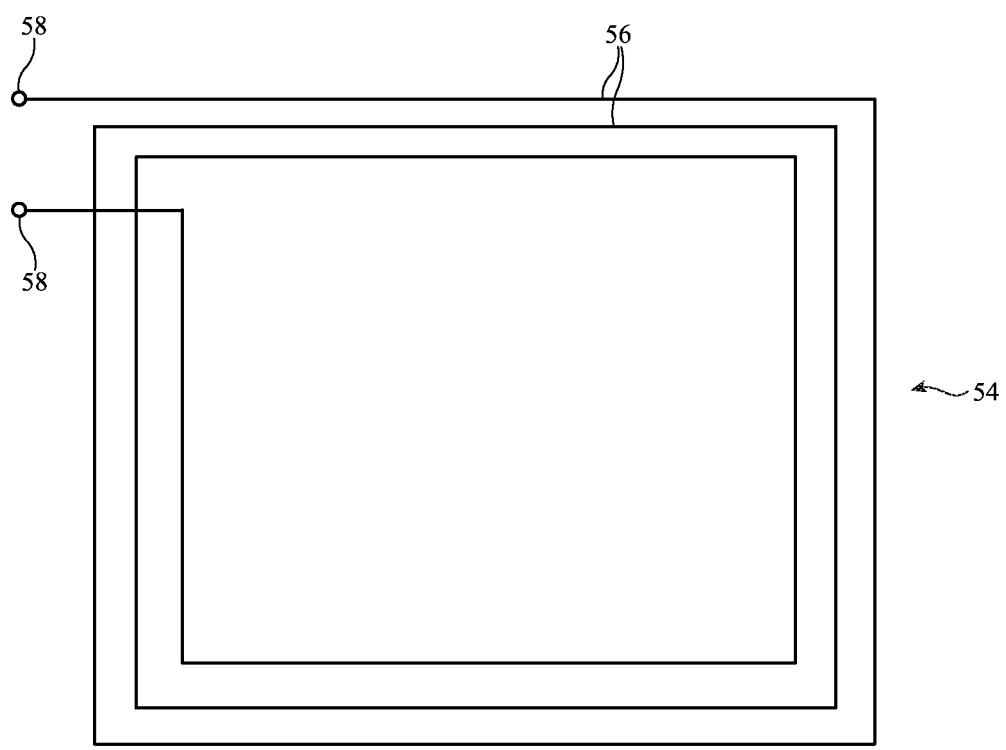
FIG. 6 is a top view of an illustrative coil serving as an antenna for near-field communications in accordance with an embodiment.

FIG. 6 is a front view of an illustrative NFC antenna of the type that may be used in forming the NFC antenna of circuitry 44 and that may be used in forming the NFC antenna of circuitry 42. As shown in FIG. 6, NFC antenna 54 may be a coil (inductor) having a rectangular ring shape with multiple turns 56 and a pair of terminals 58. There may be any suitable number of turns in the coil of antenna 54 (e.g., at least 1, at least 2, at least 5, at least 10, at least 20, fewer than 200, fewer than 50, fewer than 10, etc.). Turns 56 may be formed from patterned metal traces on or within a substrate (e.g., a printed circuit substrate, a substrate that forms part of device 36L, a substrate that forms part of element 36D, etc.).

Figure 7:
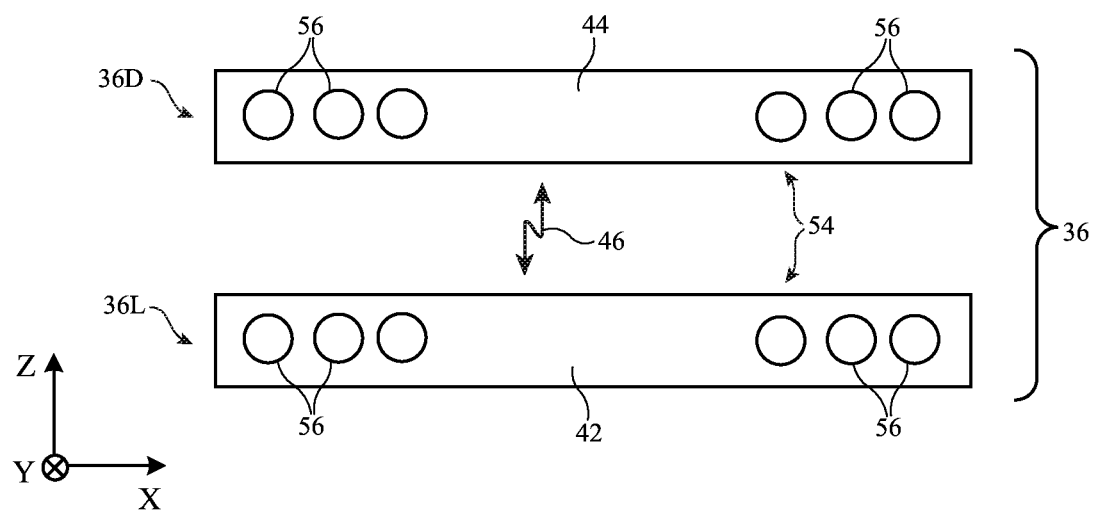
FIG. 7 is a side view of a pair of illustrative near-field communications antennas in accordance with an embodiment.

FIG. 7 is a side view of NFC antennas for component 36 (e.g., one antenna 54 associated with circuitry 44, which forms a passive side of component 36, and another (aligned) antenna 54 that is associated with circuitry 42, which forms an active side of component 36). When it is desired to transmit wireless power, an alternating-current signal may be applied to the second NFC antenna, creating wireless signals 46. When it is desired to receive wireless power, corresponding alternating-current signals that are received by the NFC antenna of the passive side may be rectified to produce direct-current power. Bidirectional NFC communications (e.g., half-duplex communications or other communications) may be performed using the antennas of the active and passive sides to transmit and/or receive data in signals 46. NFC communications between circuitry 42 and circuitry 44 may comply with radio-frequency identification (RFID) standards or may use other suitable communications protocols.

The arrangement of FIG. 7 allows wireless power to be transferred between device 36L (e.g., circuitry 42) and element 36D (e.g., circuitry 44). The arrangement of FIG. 7 also allows data to be transmitted bidirectionally. If desired, antennas 54 can also be used to make failsafe measurements. For example, circuitry 42 may include vector network analyzer circuitry or other circuitry that can measure the radio-frequency characteristics of antennas 54 (e.g., antenna impedance, antenna resonant frequency, received signal strength, etc.). These measurements may be influenced by the relative placement of antennas 54 with respect to each other or any physical change in the tag (passive side) antenna. Should antennas 54 shift laterally (e.g., within the X-Y plane), should antennas 54 (e.g., turns 56) separate (e.g., along the Z axis), and/or should antennas 54 (e.g., turns 56) tilt with respect to each other, the efficiency with which wireless signals are transmitted and/or received, the measured impedance of the antennas, the measured antenna resonant frequency, and/or other radio-frequency characteristics of the NFC circuitry in component 36 may vary. One of the NFC antennas of component 36 may be formed directly on element 36D or may be mechanically coupled to element 36D, so movements of this NFC antenna will be indicative of movement of element 36D. Another of the NFC antennas of component 36 may be formed directly on device 36L or may be mechanically coupled to device 36L (e.g., by forming the antenna on a printed circuit that is directly connected to device 36L), so movements of this other NFC antenna will be indicative of movement of device 36L. By measuring changes in one or more radio-frequency characteristics of the NFC circuitry with respect to pre-calibrated values or ranges, it can therefore be determined whether element 36D and device 36L are properly aligned or have moved with respect to each other. If misalignment or other changes are detected, suitable action may be taken. For example, light emission may be prevented from device 36L if more than a threshold amount of movement is detected.

Figure 8:
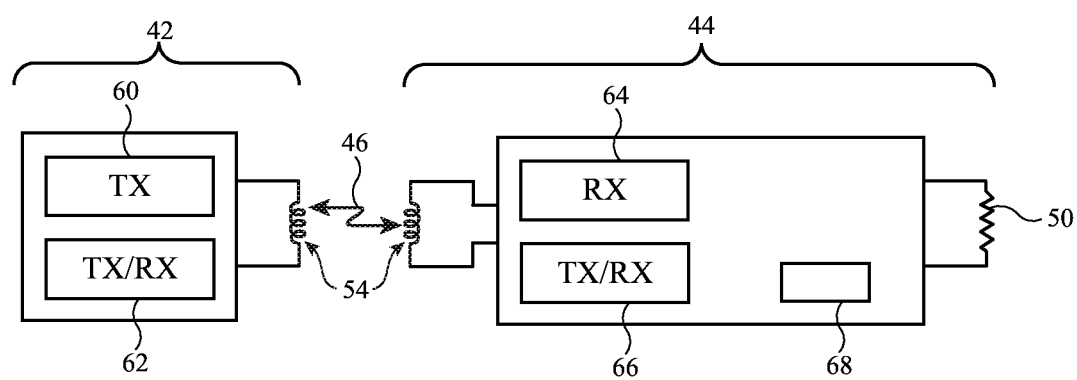
FIG. 8 is a circuit diagram of illustrative circuitry in a component with near-field communications between spatially separated parts of the component in accordance with an embodiment.

FIG. 8 is a circuit diagram of illustrative circuitry for component 36. As shown in FIG. 8, circuitry 42 may include wireless power transmitter 60 and circuitry 44 may include a corresponding wireless power receiver 64. Transmitter 60 may be used to drive alternating-current signals into one antenna 54 (e.g., an antenna 54 in circuitry 42) to produce wireless signals 46 that are received by another corresponding antenna 54 (e.g., an antenna 54 in circuitry 44). Receiver 64 may have a rectifier that rectifies the received signals from antenna 54 to produce DC power. The DC power may be used to operate circuitry 44 and may be optionally stored in energy storage device 68 (e.g., a capacitor, a battery, etc.). Transceiver circuitry 62 and 66 may support bidirectional NFC communications using antennas 54. Circuitry 62 may, for example, allow circuitry 42 to transmit data to circuitry 44 and may allow circuitry 44 to transmit data to circuitry 42 via near-field communications. If desired, transmitter 60 may be formed as part of circuitry 62 and/or receiver 64 may be formed as part of circuitry 66. During operation, circuitry 44 may use resistance measurement circuitry to measure the resistance of resistor 50 or may use any other suitable sensing circuitry to monitor the condition of the passive side circuitry.

Figure 9:
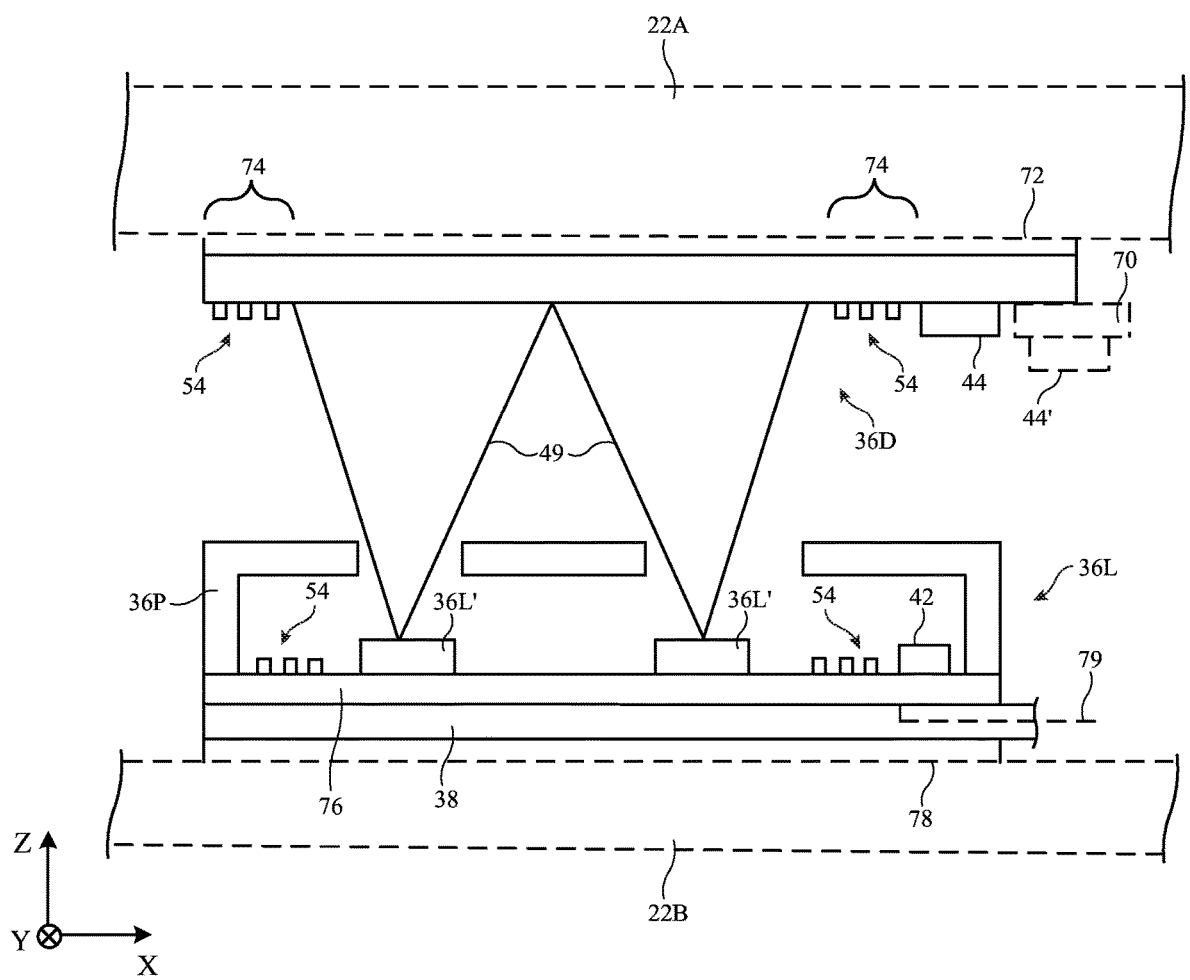
FIG. 9 is a cross-sectional side view of an illustrative optical component in accordance with an embodiment.

FIG. 9 is a cross-sectional side view of an illustrative optical component with NFC circuitry to support fail-safe monitoring between two spatially separated parts of the component. In the example of FIG. 9, component 36 includes an active side including device 36L, which may be coupled to a portion of housing 22 (e.g., housing 22B). Signal paths such as lines 79 or may supply power and/or data (e.g., control signals such as drive currents for lasers and/or other driver signals) from control circuitry 16. Device 36L may use an array of two or more lasers 36L' to emit respective beams of infrared light 49 to a corresponding passive side of component 36 such as optical element 36D. Optical element 36D may be coupled to a support structure such as housing 22A (e.g., a display cover layer formed from a transparent layer of material such as a glass layer) and/or other housing structures. Housing 22A may be coupled to housing 22B, but need not necessarily be precisely aligned with respect to housing 22B. During operation, light 49 passes through element 36D (e.g., to that element 36D may modify light 49 before this light exits device 10). Control circuitry 42 in device 36L may include one or more integrated circuits such as a laser driver integrated circuit and a separate NFC reader integrated circuit, an integrated circuit that includes both laser driver circuitry and NFC reader circuitry, or one or more other integrated circuits. In the example of FIG. 9, antenna traces for antennas 54 have been formed on optical element 36D and on printed circuit 76 (which may be, for example, a printed circuit in device 36L that is mounted to an opening in the rear of package 36P). If desired, antenna traces for antennas 54 may be formed on other support structures.

Circuitry 44 (e.g., one or more integrated circuits such as an NFC tag integrated circuit and a microcontroller unit integrated circuit that communicates with the NFC tag integrated circuit over an $I^2C$ bus or other wired communications path and/or an integrated circuit that combines circuitry from these integrated circuits onto a single die), may be supported by optical element 36D (e.g., a substrate for a diffuser or other element) and/or may be mounted on other support structures. For example, circuitry 44 may include one or more integrated circuits mounted on a printed circuit that is coupled to element 36D such as printed circuit 70 (see, e.g., circuitry 44).

If desired, electro-magnetic shielding may be incorporated into device 10 in the vicinity of component 36 (e.g., to shield surrounding components such as display 14 from radio-frequency interference from component 36 and/or to shield component 36 from radio-frequency interference from display 14 and/or other circuitry). This magnetic shielding may be formed from ferrite layers and/or other ferrimagnetic and/or ferromagnetic structures formed from magnetic material. Optionally, a layer / network of conductive material may be formed from electrical shielding grounding (see, e.g., illustrative shielding 72, which may overlap some or all of element 36D and which may have one or more openings to allow light 49 to pass and/or which may be formed in a ring such as ring 74 that overlaps ring-shape NFC antenna 54 on element 36D, as examples). Electromagnetic shielding may also be provided below device 36L (e.g., a layer of magnetic material for magnetic shielding 78 and/or a layer of conductive material for electrical shielding/ grounding may be attached under printed circuit 38). Potential interference between radio-frequency aggressors and victims may also be avoided by using time-division multiplexing, by selecting non-interfering frequencies, etc.

During the operation of device 10, control circuitry 16 in device 10 such as circuitry 42 and/or 44 may gather readings from antennas 54 and/or fail-safe resistor 50 and may process this information (e.g., by comparing measured values to thresholds). Circuitry 42 and/or 44 and/or other control circuitry in device 10 may then take action based on the processed information. As an example, if a resistance measurement indicates that element 36D has become damaged, the control circuitry can prevent device 36L from emitting light. As another example, if an antenna measurement on NFC antenna(s) 54 indicates that element 36D and device 36L have become misaligned (e.g., because someone repairing device 10 has opened up the housing of device 10 and thereby moved element 36D away from device 36L), the control circuitry can prevent device 36L from emitting light. In this way, eye and skin safety for component 36 is ensured.

In addition to controlling component 36 to ensure safely, measurements on the fail-safe resistor, the operation of NFC antennas 54, and/or other aspects of the operation of component 36 may be used in controlling adjustable components in device 10. Devices 12 may, as an example, include one or more beam shutters, switches, beam steerers, retarders, polarizers, diffusers, light modulators, filters, lenses, display components (e.g., components associated with display 14), adjustable parts of component 36, and/or other components that can be dynamically adjusted using control signals applied to these components from control circuitry 16 (e.g., circuitry 42, circuitry 44, and/or other circuitry in device 10). These adjustable components may be used in adjusting the performance of optical structures in device 10, may be used in adjusting light 49 that is provided to element 36D by device 36L or is passing through element 36D, etc. When a fail-safe resistor resistance measurement, an NFC antenna measurement, or other measurement indicates that an adjustable component should be adjusted, corresponding adjustments may be made by the control circuitry of device 10. As just one example, if components become slightly misaligned, compensating adjustments may be made using a beam steering device to correct for the misalignment. Output power adjustments to device 36L and/or other adjustable component changes may also be made using feedback from fail-safe resistor measurements, other fail-safe mechanism measurements (e.g., capacitive sensor fail-safe mechanism measurements, ultrasonic sensor fail-safe mechanism measurements, etc.), and/or NFC measurements. As an example, device 36L may have a laser(s) coupled in series with a switch and the output of the laser can be adjusted by opening and closing the switch. As another example, device 36L may have one or more lasers whose output power is adjusted by adjusting respective drive currents to the lasers. In another example, a piezoelectric actuator, stepper motor, solenoid, or other actuator may be used to adjust the position of a movable laser or other movable light-emitting subsystem in response to feedback.

Measurements by circuitry 44 may be processed locally and/or may be transmitted to circuitry 42 as raw data. Consider, as examples, the illustrative operations of FIGS. 10 and 11.

Figure 10:
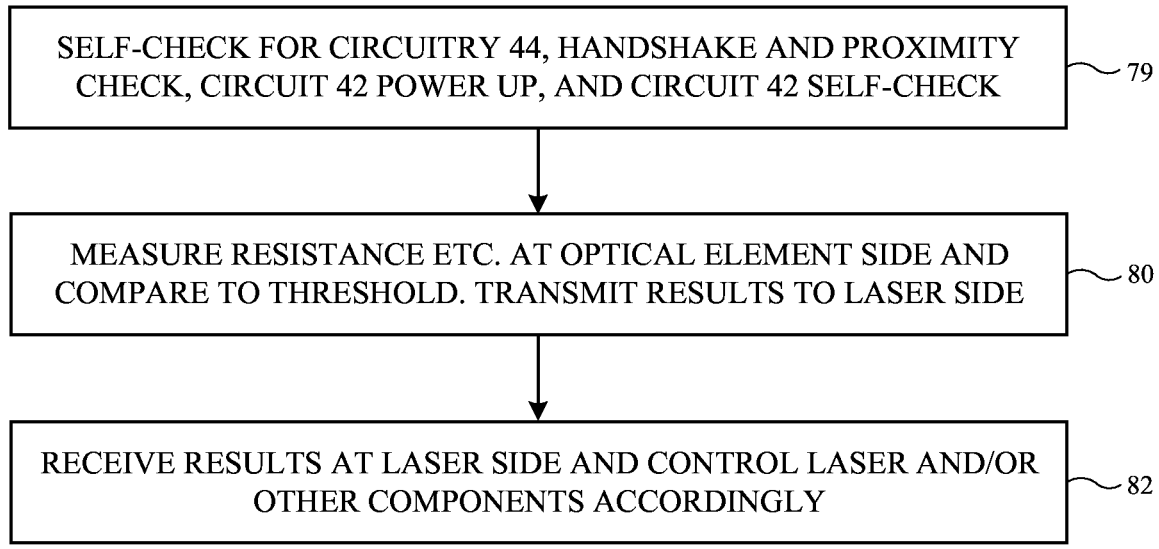
FIGS. 10 and 11 are flow charts of illustrative operations associated with monitoring an optical component in accordance with an embodiment.

In the example of FIG. 10, measurements of the resistance of fail-safe resistor 50 are processed locally by circuitry 44. For example, during the operations of block 80, circuitry 44 may measure the resistance of resistor 50 and may compare this measured resistance value to a predetermined threshold amount or may use any other type of sensing to check on the passive side (e.g., fail-safe sensing mechanisms based on capacitive sensors, ultrasonic sensors, and/or other fail-safe mechansism information gathered by the passive side using, for example, a fail-safe mechanisms coupled to an optical component or other passive side device). Prior to performing the measurement operations of block 80, pre-measurement set-up and checking operations may be performed. For example, during the operations of block 79, circuitry 44 may perform self-checking operations, circuitry 42 and 44 may perform handshaking and proximity checking, circuitry 42 may power up, and circuitry 42 may perform self-checking operations. Upon successful completion of block 79, operations may proceed to block 80.

The results of threshold comparisons or other resistance measurement processing operations can be wirelessly transmitted from circuitry 44 to circuitry 42 by near-field communications. If a measured resistance is less than a threshold, a logical "0" or other information indicating that the resistance is less than the threshold may be transmitted to circuitry 42. In response to determining that the measured resistance is greater than the threshold, circuitry 44 can conclude that element 36D has been damaged and can send circuitry 42 a logical "1" or other information indicating that appropriate action should be taken.

During the operations of block 82, the processed results that were transmitted by circuitry 44 may be received at circuitry 42 and used by circuitry 42 in taking appropriate action (e.g., by blocking the emission of light 49, by adjusting an adjustable component, etc.). In addition to measuring the resistance of fail-safe resistor 50 during the operations of block 80, circuitry 44 may make NFC antenna impedance measurements, may make antenna resonant frequency measurement, and/or may make other measurements that are processed locally before corresponding results are sent to circuitry 42. The transmission of processed data indicative of the state of resistor 50 is illustrative. With an arrangement of the type shown in FIG. 10 in which data is processed before being transmitted from circuitry 44 to circuitry 42, the amount of bandwidth consumed by the NFC communications between circuitry 44 and circuitry 42 may be reduced.

Figure 11:
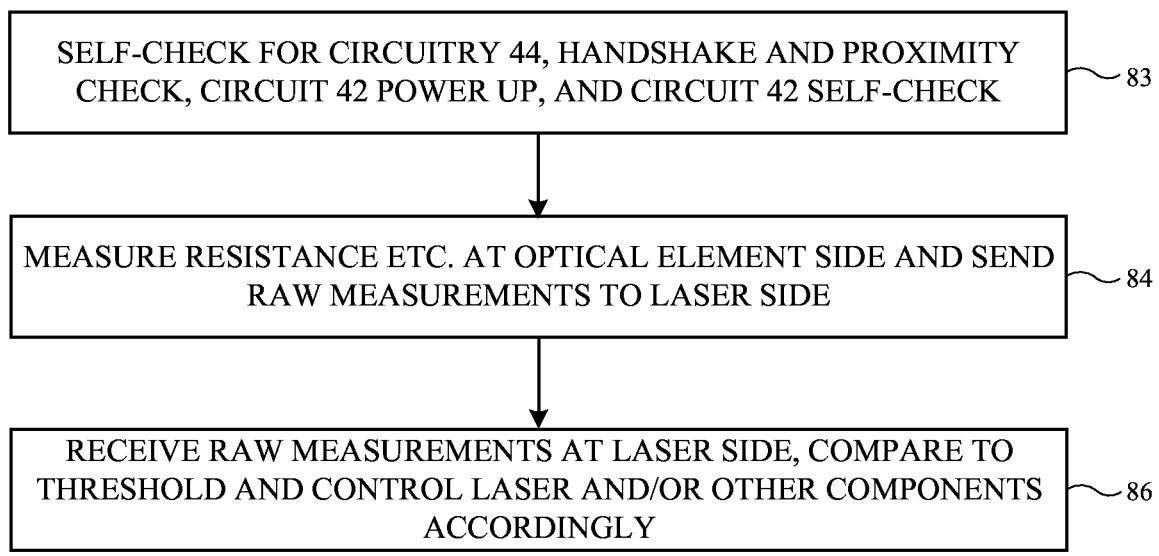

An alternative approach is shown in the flow chart of FIG. 11. With this approach, raw data is transmitted from circuitry 44 to circuitry 42 for processing. For example, during the operations of block 84, circuitry 44 may measure the resistance of fail-safe resistor 50 and may send these measurements (without processing) to circuitry 42. Prior to performing the measurement operations of block 84, pre-measurement set-up and checking operations may be performed. For example, during the operations of block 83, circuitry 44 may perform self-checking operations, circuitry 42 and 44 may perform handshaking and proximity checking, circuitry 42 may power up, and circuitry 42 may perform self-checking operations. Upon successful completion of block 83, operations may proceed to block 80.

During the operations of block 86, circuitry 42 may receive and process the raw resistance measurements (e.g., each resistance measurement may be compared to a threshold resistance value to determine whether optical element 36D has been damaged). If a measured resistance is determined to be greater than the desired resistance value, appropriate action may be taken (e.g., device 36L may be turned off to prevent emission of light 49). If desired, near-field communications antenna measurements (e.g., antenna impedance measurements, resonant frequency measurements, received signal strength measurements, etc.) may be made during the operations of block 84 and transmitted as raw data to circuitry 42.

In some embodiments, data gathered by measurements at circuitry 44 may be processed locally (in circuitry 44) and may also be processed in circuitry 42. Circuitry 42 may also make local measurements that characterize the operation of component 36. As an example, circuitry 42 may make NFC antenna measurements using antenna(s) 54 (e.g., circuitry 42 may use vector network analyzer circuitry or other circuitry to measure antenna resonant frequency, to measure antenna impedance, to gather received signal strength information, etc.), may gather local resistance measurements on fail-safe traces in circuitry 42, and/or may gather other data locally. Circuitry 42, circuitry 44, and/or other control circuitry 16 in device 10 may take any suitable action in response to resistance measurements, near-field communications antenna measurements, and/or other measurements. These actions may include, for example, partly lowering the power of light 49 or preventing the emission of light 49, adjusting adjustable components, issuing alerts, etc.

Figure 12:
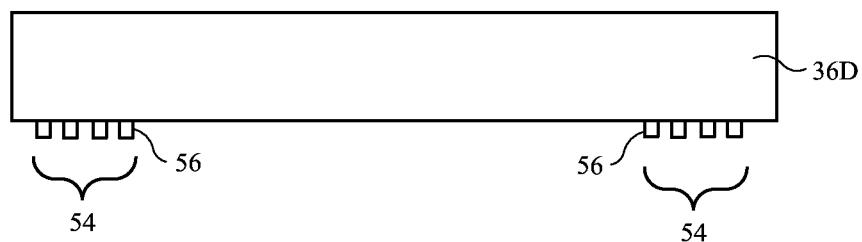
FIGS. 12 and 13 are side views of illustrative optical elements with near-field communications antennas in accordance with embodiments.
Figure 13:
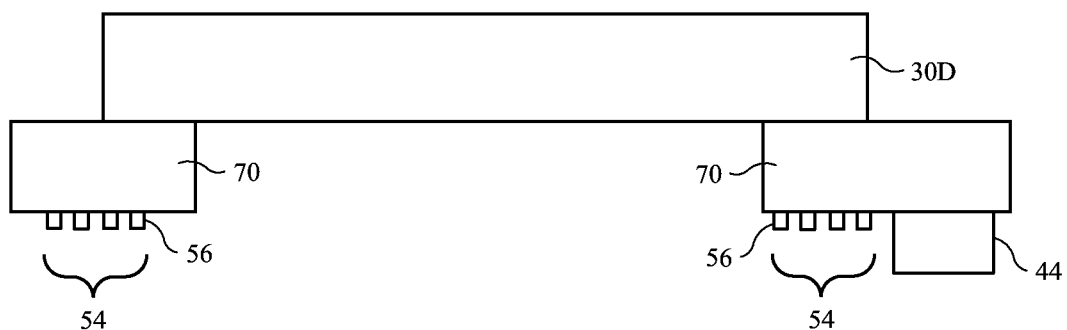

Antenna traces for antennas 54 may be formed at any suitable location in component 36. As an example, turns 56 for antenna 54 of element 36D may be formed from a metal trace that is patterned directly on element 36D as shown in FIG. 12 or may be formed on a separate printed circuit such as ring-shaped printed circuit 70 of FIG. 13, which is coupled to element 36D (e.g., with anisotropic conductive film connections, solder joints, welds, or other conductive connections). If desired, turns 56 in antenna 54 may also be used to form fail-safe resistor 50 (e.g., the same conductive trace (e.g., a metal trace or a trace formed from other conductive material) may be used in forming antenna 54 and resistor 50 to conserve space on element 36D).

Figure 14:
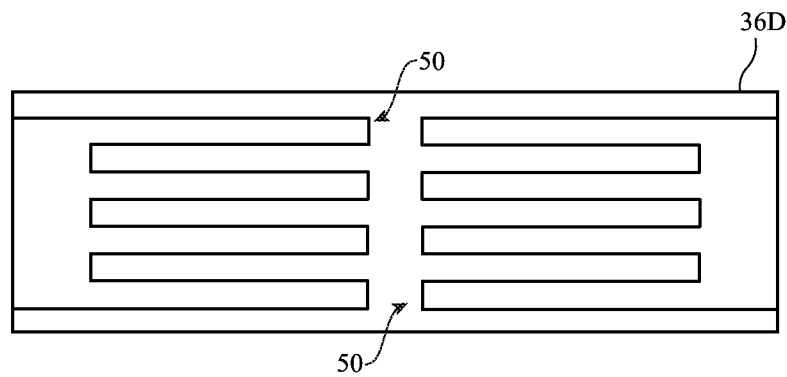
FIG. 14 is a top view of an illustrative optical element with a pair of failsafe resistors formed from metal traces in different regions of the element in accordance with an embodiment.

One or more portions of components 36 may have fail-safe sensors. As shown in FIG. 14, for example, multiple fail-safe resistors 50 may be formed from different respective metal traces on element 36D (e.g., different regions of element 36D may be covered with different respective resistors 50, allowing circuitry 44 to gather information on the location of potential damage in element 36).

Figure 15:
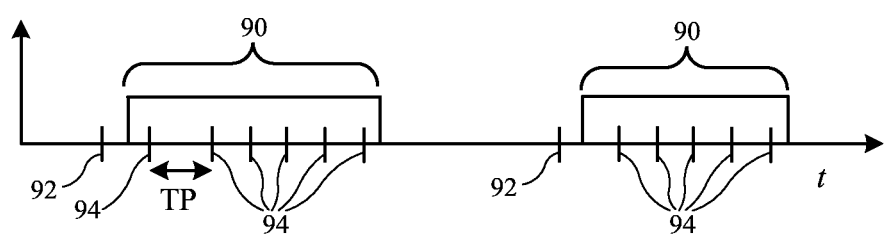
FIG. 15 is an illustrative timing diagram showing how component operations may be monitored in accordance with an embodiment.

Monitoring operations (e.g., resistance monitoring operations on one or more fail-safe resistors) and/or other monitoring operations (e.g., NFC antenna measurements such as impedance measurement, resonant frequency measurements, or other measurements such as measurements made using vector network analyzer circuitry, received signal strength measurements, etc.) may be made at any suitable time during the operations of device 10. Consider, as an example, the timing diagram of FIG. 15. In FIG. 15, time periods 90 corresponding to periods of time when device 36L is active and is emitting light 49. In this example, device 36L is otherwise turned off. Resistance measurements or other fail-safe measurements may be made just before each active laser period (see, e.g., times 92, just before the laser is turned on during periods 90), may be made during time periods 90 (e.g., at times 94 which may, as an example, be spaced apart by a time period TP of at least 1 ms, at least 5 ms, at least 20 ms, less than 100 ms, less than 30 ms, less than 15 ms, or other suitable time period), and/or may be made at any other suitable times (e.g., periodically during use of device 10 regardless of whether light 49 is being emitted). Data may be wirelessly transferred between circuitry 44 and circuitry 42 at 424 kbit/s (in accordance with some NFC protocols) or at other suitable data transfer rates (e.g., a custom data transfer rate above or below 424 kbit/s).

If desired, measured fail-safe resistance values for resistor 50 may be retained within circuitry 44. For example, a battery or other energy storage device (see, e.g., energy storage device 68 of FIG. 8) may power circuitry 44 so that circuitry 44 can continually log resistance measurements from resistor 50 and/or other measurements. Log data may be processed periodically to determine whether a fault is present and/or whether adjustments should be made to adjustable components. For example, once every N resistance measurements, aggregated measurements and/or individual measurements from the log may be transmitted wirelessly form circuitry 44 to circuitry 42. The value of N may be at least 5, at least 10, 12, at least 20, less than 50, less than 25, less than 7, or other suitable number.

To ensure that component 36 is operating correctly, it may be desirable to authenticate the parts of component 36 that operate with each other. As an example, element 36D may be provided with authentication information such as a serial number or other identifier. This identifier may be stored in circuitry 44. As circuitry 42 and 44 communicate wirelessly using near-field communications, the authenticity of the identifier may be periodically check to ensure that element 36D is authentic. In this way, component 36 can be certified as an authentic component. If an uncertified component is detected (e.g., if circuitry 42 determines that the authentication information received from circuitry 44 is inauthentic), light emission from device 36L can be prevented to ensure safety.

Figure 16:
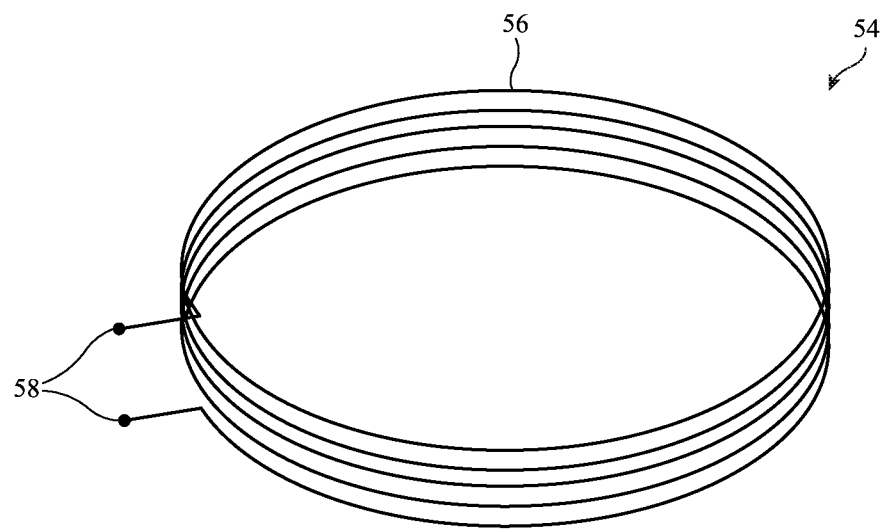
FIG. 16 is a perspective view of an illustrative near-field communications antenna formed using a three-dimensional set of coil turns in accordance with an embodiment.

Although sometimes described in the context of two-dimensional printed circuit antennas, antennas 54 may be formed using spiral loops of wire and/or spiral paths formed from stacked thin-film traces. With this type of arrangement, one or both of antennas 54 may have a three-dimensional shape as shown in FIG. 16 (e.g., turns 56 may be stacked on top of each other in multiple layers).

Although sometimes described in the context of fail-safe mechanisms such as fail-safe resistors that are monitored using resistance sensing circuitry, fail-safe mechanisms may be implemented using other types of sensors, if desired. As an example, a fail-safe mechanism may be based on a capacitive sensor that gathers capacitance measurements. The capacitance measurements may indicate whether subsystems have shifted out of alignment, and/or whether other undesired changes have occurred to the alignment and/or operation of a subsystem. In another illustrative configuration, a fail-safe mechanism may be based on an ultrasonic sensor that has an ultrasonic transducer that transmits ultrasonic signals and that has one or more microphones that gather reflected ultrasonic signals. By monitoring the ultrasonic sensor, movements of subsystems with respect to each other and/or other changes to the operating status of a system and/or subsystem may be monitored. In general, fail-safe mechanisms may be implemented using sensors that monitor currents, voltages, capacitances, resistances, inductances, sound, light, temperature, and/or other physical properties.

The foregoing is merely illustrative and various modifications can be made to the described embodiments. The foregoing embodiments may be implemented individually or in any combination.

| Table of Reference Numerals | | | |
|---|---|---|---|
| 10 | Electronic device | 12 | Input-output devices |
| 14 | Display | 18 | Sensors |
| 16 | Control circuitry | 22, 22A, 22B | Housing |
| 22C | Display cover layer | R | Rear |
| F | Front | 36 | Components |
| 38 | Printed circuit | 30 | Interior |
| 32 | Exterior | 40 | Structure |

-continued

Table of Reference Numerals

| | | | |
|---|---|---|---|
| 42, 44, 44' | Circuitry | 36D | Optical element |
| 36L | Light-emitting device | 46 | Wireless signals |
| 49 | Light | D | Distance |
| 50 | Resistor | 52 | Terminals |
| 54 | Antenna | 58 | Terminals |
| 56 | Turns | 60, 64, 62, 66 | Circuitry |
| 68 | Energy storage device | 70 | Printed Circuit |
| 74 | Ring | 72, 78 | Shielding |
| 76 | Printed circuit | 36P | Package |
| 80, 82, 84, 86 | Blocks | 90 | Time periods |
| 92, 94 | Times | 79 | Wires |

What is claimed is:

1. An electronic device, comprising:
    a housing; and
    an optical component in the housing, wherein the optical component comprises a passive side having a passive side near-field communications antenna and an active side having an active side near-field communications antenna, wherein the passive side comprises an optical element and a conductive trace on the optical element, wherein the passive side is configured to use the passive side near-field communications antenna to communicate with the active side, and wherein the active side is configured to use the active side near-field communications antenna to communicate with the passive side.

2. The electronic device defined in claim 1 wherein the conductive trace has a plurality of turns and is configured to form the passive side near-field communications antenna.

3. The electronic device defined in claim 2 wherein the conductive trace forms a fail-safe resistor.

4. The electronic device defined in claim 1 wherein the passive side further comprises a fail-safe mechanism.

5. The electronic device defined in claim 4 wherein the passive side is configured to monitor the fail-safe mechanism.

6. The electronic device defined in claim 5 wherein the passive side is configured to use the passive side near-field communications antenna to wirelessly transmit information gathered by monitoring the fail-safe mechanism to the active side.

7. The electronic device defined in claim 5 wherein the passive side is configured to compare measurements from the fail-safe mechanism to a threshold and is configured to use the passive side near-field communications antenna to wirelessly transmit results of the comparisons to the active side.

8. The electronic device defined in claim 1 further comprising a printed circuit coupled to the optical element, wherein the passive side near-field communications antenna is formed from a conductive trace on the printed circuit.

9. The electronic device defined in claim 1 wherein the active side comprises a light-emitting device configured to emit light through the optical element.

10. The electronic device defined in claim 9 further comprising a fail-safe mechanism to monitor the optical element, wherein the light-emitting device comprises a laser, wherein the passive side is configured to use the passive side near-field communications antenna to wirelessly provide the active side with information gathered by monitoring the fail-safe mechanism, and wherein the active side is configured to adjust the laser based at least partly on the information.

11. The electronic device defined in claim 1 wherein the active side is configured to make measurements on the active side near-field communications antenna and is configured to adjust the active side based at least partly on the measurement.

12. The electronic device defined in claim 11 where the measurements comprise near-field communications antenna impedance measurements.

13. The electronic device defined in claim 1 wherein the active side comprises vector network analyzer circuitry coupled to the active side near-field communications antenna.

14. The electronic device defined in claim 13 wherein the active side comprises a laser and wherein the active side is configured to adjust the laser based on information from the vector network analyzer circuitry.

15. The electronic device defined in claim 1 wherein the conductive trace forms a fail-safe resistor, wherein the active side comprises a laser configured to emit light through the optical element, and wherein the passive side is configured to log data gathered on the fail-safe resistor.

16. The electronic device defined in claim 1 wherein the optical element has multiple regions covered by multiple respective fail-safe resistors and wherein the passive side is configured to monitor the fail-safe resistors.

17. The electronic device defined in claim 1 wherein the passive side and active side near-field communications antennas are configured to convey wireless signals between the passive and active sides, the electronic device further comprising an adjustable device, wherein the active side is configured to adjust the adjustable device based on feedback associated with measurements of the wireless signals, wherein the adjustable device comprises an adjustable device selected from the group consisting of: a laser with an adjustable output power, a laser controlled by an adjustable switch, and a movable laser.

18. The electronic device defined in claim 1 wherein the active side comprises a light-emitting device configured to emit light through the optical element, wherein the active side is configured to detect when the passive side and active side near-field communications antennas move relative to each other, and wherein the active side is configured to halt light emission from the light-emitting device in response to detecting that the passive side and active side near-field communications antennas have moved relative to each other.

19. The electronic device defined in claim 1 wherein the passive side is configured to form a near-field communications tag.

20. The electronic device defined in claim 19 wherein the active side is configured to form a near-field communications reader.

21. The electronic device defined in claim 20 wherein the active side comprises a laser configured to emit light through the optical element.

22. The electronic device defined in claim 21 wherein the passive side is configured to store authentication information and wherein the active side is configured to prevent light emission from the laser in response to determining that the authentication information is inauthentic.

23. An optical component comprising:
    passive and active sides that are separated by an air gap and that are not electrically connected, wherein the passive side comprises:
        an optical element having a fail-safe resistor; and passive side circuitry that is configured to measure the fail-safe resistor and that is configured to transmit information about the fail-safe resistor via near-field communications, and wherein the active side comprises:
a light-emitting device; and
active side circuitry that is configured to receive the information about the fail-safe resistor via near-field communications and that is configured to adjust the light-emitting device based on the received information.

24. An optical component, comprising:
an optical element;
a conductive trace on the optical element forming a fail-safe resistor;
a passive side near-field communications antenna;
passive side circuitry configured to:
  receive wireless power using the passive side near-field communications antenna;
  monitor the fail-safe resistor to gather information on damage to the optical element; and
  transmit the information using the passive side near-field communications antenna; and
an infrared laser that is not electrically connected to the passive side circuitry;
an active side near-field communications antenna; and
active side circuitry configured to receive the transmitted information and adjust the infrared laser based on the received information.

25. The optical element defined in claim 24 wherein the active side circuitry is configured to monitor the active side near-field communications antenna to detect when the passive side near-field communicators antenna has been moved relative to the active side near-field communications antenna and is configured to prevent light emission from the infrared laser in response to detecting that the passive side near-field communications antenna has been moved relative to the active side near-field communications antenna.

26. A system, comprising:
passive side subsystem having a passive side near-field communications antenna and having passive side circuitry configured to receive wireless power using the passive side near-field communications antenna; and
an active side subsystem having an active side near-field communications antenna configured to wirelessly communicate with the passive side near-field communications antenna, wherein the active side subsystem is configured to use the active side near-field communications antenna to monitor relative position between the passive side subsystem and the active side subsystem.

27. A non-transitory computer-readable storage medium storing one or more programs having computer-executable instructions configured to be executed by one or more circuits of an electronic device, the computer-executable instructions comprising instructions for:
with a passive side of a system in the device, monitoring a fail-safe mechanism;
with a passive side near-field communications antenna in the passive side, wirelessly transmitting information gathered by monitoring the fail-safe mechanism;
with an active side near-field communications antenna in an active side of the system in the device, receiving the wirelessly transmitted information; and
adjusting an adjustable device in the active side based on the received wirelessly transmitted information.

* * * * *